United States Patent
Wang

(10) Patent No.: US 10,594,592 B1
(45) Date of Patent: Mar. 17, 2020

(54) CONTROLLING ADVERTISEMENTS, SUCH AS BORDER GATEWAY PROTOCOL ("BGP") UPDATES, OF MULTIPLE PATHS FOR A GIVEN ADDRESS PREFIX

(71) Applicant: Juniper Networks, Inc., Sunnyvale, CA (US)

(72) Inventor: Lili Wang, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 180 days.

(21) Appl. No.: 15/720,991

(22) Filed: Sep. 29, 2017

(51) Int. Cl.
*H04L 12/715* (2013.01)
*H04L 12/707* (2013.01)
*H04L 12/751* (2013.01)
*H04L 12/733* (2013.01)

(52) U.S. Cl.
CPC .............. *H04L 45/04* (2013.01); *H04L 45/02* (2013.01); *H04L 45/22* (2013.01); *H04L 45/126* (2013.01)

(58) Field of Classification Search
None
See application file for complete search history.

(56) References Cited

U.S. PATENT DOCUMENTS

| 2007/0214280 A1* | 9/2007 | Patel ....................... H04L 45/04 709/239 |
| 2012/0063460 A1* | 3/2012 | Hallivuori ............... H04L 45/02 370/392 |
| 2017/0289013 A1* | 10/2017 | Haas ...................... H04L 45/021 |
| 2017/0346727 A1* | 11/2017 | Perrett .................. H04L 45/126 |
| 2018/0109450 A1* | 4/2018 | Filsfils .................... H04L 45/74 |

* cited by examiner

*Primary Examiner* — Jutai Kao
(74) *Attorney, Agent, or Firm* — John C. Pokotylo; Pokotylo Patent Services

(57) ABSTRACT

BGP can advertise multiple routes for same prefix via BGP add path (RFC 7911). BGP attempts to pack prefixes with same path attributes into the same BGP update message. Protocol nexthop is one of the path attributes. Since these BGP add paths routes usually have different protocol nexthops, different routes for a single prefix could end up being spread out when being advertised. That may, in turn, result in additional calls to download routes to FIB, advertisement to peers and multiple runs of multipath calculation for the same prefix when multipath is configured. To help avoid this situation, when BGP advertises add-path routes, BGP can send the multiple paths for the same prefix in the adjacent update messages. BGP can use extended Network Layer Reachability Information (NLRI) field to carry nexthop along with its associated prefix in BGP update message to send plain IPv4 unicast routes. In addition, BGP reachability information can be encoded in MP_REACH_NLRI attribute with which protocol nexthop information is carried along with its own prefix in the extended "NLRI" field. A BGP speaker can use some data structure to link these routes for the same prefix and put multiple routes for the same prefix in adjacent or even same BGP update messages.

20 Claims, 12 Drawing Sheets

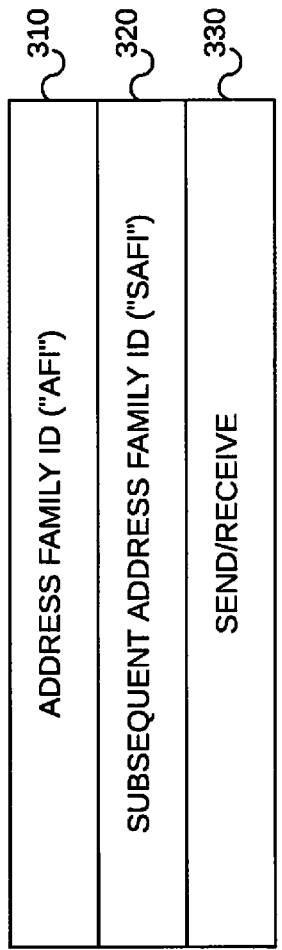
FIGURE 2
*(Prior Art)*
FIGURE 3
*(Prior Art)*
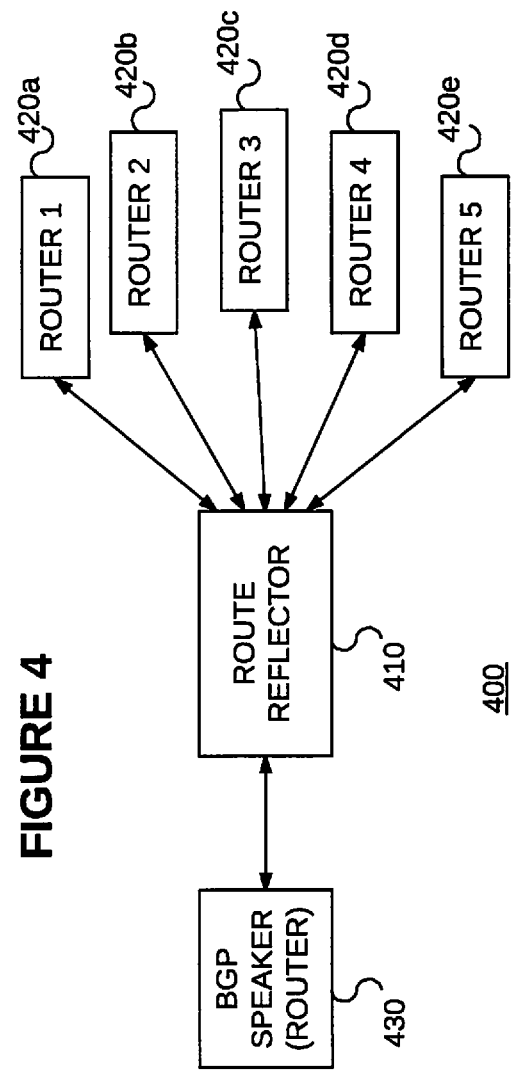
FIGURE 4

CONTROLLING ADVERTISEMENTS, SUCH AS BORDER GATEWAY PROTOCOL ("BGP") UPDATES, OF MULTIPLE PATHS FOR A GIVEN ADDRESS PREFIX

§ 1. BACKGROUND OF THE INVENTION

§ 1.1 Field of the Invention

Example embodiments consistent with the present invention concern network communications. In particular, some such example embodiments concern improving the advertisement of multiple paths in BGP, such as that described in request for comment ("RFC") 7911 (incorporated herein by reference) of the Internet Engineering Task Force ("IETF").

§ 1.2 Background Information

In network communications systems, protocols are used by devices, such as routers for example, to exchange network information. Routers generally calculate routes (also referred to as "paths") used to forward data packets towards a destination. Some protocols, such as the Border Gateway Protocol ("BGP"), which is summarized in § 1.2.1 below, allow routers in different autonomous systems ("ASes") to exchange reachability information.

§ 1.2.1 the Border Gateway Protocol ("BGP")

The Border Gateway Protocol (BGP) is an inter-Autonomous System routing protocol. The following refers to the version of BGP described in RFC 4271 (incorporated herein by reference). The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself (In this context, a BGP speaker is said to "use" a BGP route if it is the most preferred BGP route and is used in forwarding.) Please note, however, that a BGP speaker might not be in the forwarding path. For example, a route reflector or a software defined network ("SDN") controller might not download routes to their forwarding tables.

Generally, routing information exchanged via BGP supports only a destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension.

KEEPALIVE messages may be sent periodically to ensure that the connection is live. NOTIFICATION messages are sent in response to errors or special conditions. If a connection encounters an error condition, a NOTIFICATION message is sent and the connection is closed.

A BGP peer in a different AS is referred to as an external peer, while a BGP peer in the same AS is referred to as an internal peer. Internal BGP and external BGP are commonly abbreviated as IBGP and EBGP, respectively.

If a particular AS has multiple BGP speakers and is providing transit service for other ASes, then care must be taken to ensure a consistent view of routing within the AS. A consistent view of the interior routes of the AS is provided by the IGP used within the AS. In some cases, it is assumed that a consistent view of the routes exterior to the AS is provided by having all BGP speakers within the AS maintain IBGP with each other.

In RFC 4271, a "route" is defined as a unit of information that pairs an address prefix with the set of path attributes. The address prefix can be carried in the Network Layer Reachability Information ("NLRI") field of an UPDATE message or MP_REACH_NLRI attribute, and the set of path attributes is reported in the path attributes field of the same UPDATE message.

Routes are advertised between BGP speakers in UPDATE messages. Multiple destinations that share the same set of path attributes can be advertised in a single UPDATE message by including multiple prefixes in the NLRI field of the UPDATE message or in the MP_REACH_NLRI path attribute of the UPDATE message.

BGP provides mechanisms by which a BGP speaker can inform its peers that a previously advertised route is no longer available for use. There are three methods by which a given BGP speaker can indicate that a route has been withdrawn from service. First, the IP prefix that expresses the destination for a previously advertised route can be advertised in the WITHDRAWN ROUTES field in the UPDATE message or reported in the MP_UNREACH path attribute, thus marking the associated route as being no longer available for use. Second, a replacement route with the same NLRI can be advertised. Third, the BGP speaker connection can be closed, which implicitly removes all routes the pair of speakers had advertised to each other from service. Changing the attribute(s) of a route may be accomplished by advertising a replacement route. The replacement route carries new (changed) attributes and has the same address prefix as the original route.

§ 1.2.1.1 BGP "Update" Messages

In BGP, UPDATE messages are used to transfer routing information between BGP peers. The information in the UPDATE message can be used to construct a graph that describes the relationships of the various Autonomous Systems. More specifically, an UPDATE message is used to advertise feasible routes that share a common set of path attribute value(s) to a peer (or to withdraw multiple unfeasible routes from service). An UPDATE message MAY simultaneously advertise a feasible route and withdraw multiple unfeasible routes from service.

The UPDATE message includes a fixed-size BGP header, and also includes the other fields, as shown in FIG. 1A. (Note some of the shown fields may not be present in every UPDATE message). Referring to FIG. 1A, the "Withdrawn Routes Length" field 110 is a 2-octets unsigned integer that indicates the total length of the Withdrawn Routes field 120 in octets. Its value allows the length of the Network Layer Reachability Information field 150 to be determined, as specified below. A value of 0 indicates that no routes are being withdrawn from service, and that the WITHDRAWN ROUTES field 120 is not present in this UPDATE message 100.

The "Withdrawn Routes" field 120 is a variable-length field that contains a list of IP address prefixes for the routes that are being withdrawn from service. Each IP address prefix is encoded as a 2-tuple 120' of the form <length, prefix>. The "Length" field 122 indicates the length in bits of the IP address prefix. A length of zero indicates a prefix that matches all IP addresses (with prefix, itself, of zero octets). The "Prefix" field 124 contains an IP address prefix, followed by the minimum number of trailing bits needed to make the end of the field fall on an octet boundary. Note that the value of trailing bits is irrelevant.

Still referring to FIG. 1A, the "Total Path Attribute Length" field 130 is a 2-octet unsigned integer that indicates the total length of the Path Attributes field 140 in octets. Its value allows the length of the Network Layer Reachability Information field 150 to be determined. A value of 0 indicates that neither the Network Layer Reachability Information field 150 nor the Path Attribute field 140 is present in this UPDATE message.

The "Path Attributes" field 140 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 150 is a variable length field that contains a list of Internet Protocol ("IP") address prefixes. The length, in octets, of the Network Layer Reachability Information is not encoded explicitly, but can be calculated as: UPDATE message Length −23−Total Path Attributes Length (Recall field 130)−Withdrawn Routes Length (Recall field 110) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix> 150', whose fields are shown in FIG. 1A and described here. The "Length" field 152 indicates the length in bits of the IP address prefix. A length of zero indicates a prefix that matches all IP addresses (with prefix, itself, of zero octets). The "Prefix" field 154 contains an IP address prefix, followed by enough trailing bits to make the end of the field fall on an octet boundary. Note that the value of the trailing bits is irrelevant.

Referring to FIG. 1B, RFC 4760 (incorporated herein by reference) describes a way to use the path attribute(s) field 410 of a BGP update message 100 to carry routing information for multiple Network Layer protocols (such as, for example, IPv6, IPX, L3VPN, etc.) More specifically, RFC 4760 defines two new path attributes—(1) Mulitprotocol Reachable NLRI ("MP_Reach_NLRI") and (2) Multiprotocol Unreachable NLRI ("MP_Unreach_NLRI"). The first is used to carry the set of reachable destinations together with next hop information to be used for forwarding to these destinations, while the second is used to carry a set of unreachable destinations. Only MP_Reach_NLRI is discussed below.

Referring to FIG. 1B, the MP_Reach_NLRI "path attribute" 140' includes an address family identifier ("AB") (2 octet) field 141, a subsequent address family identifier ("SAFI") (1 octet) field 142, a length of Next Hop Network Address (1 octet) field 143, a Network Address of Next Hop (variable) field 144, a Reserved (1 octet) field 145 and a Network Layer Reachability Information (variable) field 146. The AFI and SAFI fields 141 and 142, in combination, identify (1) a set of Network Layer protocols to which the address carried in the Next Hop field 144 must belong, (2) the way in which the address of the Next Hop is encoded, and (3) the semantics of the NLRI field 146. The Network Address of Next Hop field 144 contains the Network Address of the next router on the path to the destination system. The NLRI field 146 lists NLRI for feasible routes that are being advertised in the path attribute 140. That is, the next hop information carried in the MP_Reach_NLRI 140' path attribute defines the Network Layer address of the router that should be used as the next hope to the destination(s) listed in the MP_NLRI attribute in the BGP Update message.

An UPDATE message can advertise, at most, one set of path attributes (Recall field 140), but multiple destinations, provided that the destinations share the same set of attribute value(s). All path attributes contained in a given UPDATE message apply to all destinations carried in the NLRI field 150 of the UPDATE message.

As should be apparent from the description of fields 110 and 120 above, an UPDATE message can list multiple routes that are to be withdrawn from service. Each such route is identified by its destination (expressed as an IP prefix), which unambiguously identifies the route in the context of the BGP speaker-BGP speaker connection to which it has been previously advertised.

An UPDATE message might advertise only routes that are to be withdrawn from service, in which case the message will not include path attributes 140 or Network Layer Reachability Information 150. Conversely, an UPDATE message might advertise only a feasible route, in which case the WITHDRAWN ROUTES field 120 need not be present. An UPDATE message should not include the same address prefix in the WITHDRAWN ROUTES field 120 and Network Layer Reachability Information field 150 or "NLRI" field in the MP_REACH_NLRI path attribute field 146.

§ 1.2.2 Advertising Multiple Paths for a Given Address Prefix in BGP

RFC 7911 defines a BGP extension that allows the advertisement of multiple paths for the same address prefix without the new paths implicitly replacing any previous ones. The essence of the extension is that each path is identified by a "Path Identifier" in addition to the address prefix.

§ 1.2.2.1 Identifying a Path Under RFC 7911

The procedures in RFC 4271 allow only the advertisement of one path for a particular address prefix. Consequently, a path for an address prefix from a BGP peer can be keyed on the address prefix.

For a BGP speaker to advertise multiple paths for the same address prefix, RFC 7911 specifies a new identifier (termed "Path Identifier" hereafter) so that a particular path for an address prefix can be identified by the combination of (1) the address prefix and (2) the Path Identifier.

The assignment of the Path Identifier for a path by a BGP speaker is purely a local matter. However, the Path Identifier must be assigned such that the BGP speaker can use the (Prefix, Path Identifier) to uniquely identify a path advertised to a neighbor. A BGP speaker that re-advertises a route generates its own Path Identifier to be associated with the re-advertised route. A BGP speaker that receives a route should not assume that the identifier carries any particular semantics.

§ 1.2.2.2 Extended NLRI Encodings Under RFC 7911

Referring to FIG. 2, to carry the Path Identifier in an UPDATE message, RFC 7911 extends the NLRI encoding 150' by prepending the Path Identifier field 156, which is of four octets. For example, the NLRI encoding specified in RFC 4271 may be extended as shown in FIG. 2 by adding the path ID field 156 to the length field 152 and the prefix field 154.

§ 1.2.2.3 Add-Path Capability Under RFC 7911

The ADD-PATH Capability is a BGP capability (See, e.g., RFC 5492, incorporated herein by reference), with Capability Code 69. The Capability Length field of this capability is variable. The Capability Value field consists of one or more tuples of the form <address family ID, subsequent address family ID, send/receive>. Referring to FIG. 3, the "Address Family Identifier" ("AB") field 310 is the same as the one used in RFC 4760 (incorporated herein by reference). The "Subsequent Address Family Identifier" ("SAFI") field 320 is the same as the one used in RFC 4760. Finally, the "Send/Receive" field 330 indicates whether the sender is (a) able to receive multiple paths from its peer (value 1), (b) able to send multiple paths to its peer (value 2), or (c) both (value 3) for the <AFI, SAFI> pair defined by the contents of fields 310 and 320. If any other value is received, then the capability should be treated as not understood and ignored.

A BGP speaker that wishes to indicate support for multiple AFI/SAFIs does so by including the information in a single instance of the ADD-PATH Capability.

§ 1.2.2.4 Operation of RFC 7911

The Path Identifier 156 specified above can be used to advertise multiple paths for the same address prefix without subsequent advertisements replacing the previous ones. Apart from the fact that this is now possible, the route advertisement rules of RFC 4271 are not changed. In particular, a new advertisement for a given address prefix and a given Path Identifier replaces a previous advertisement for the same address prefix and Path Identifier. If a BGP speaker receives a message to withdraw a prefix with a Path Identifier not seen before, it should silently ignore it.

For a BGP speaker to be able to send multiple paths to its peer, that BGP speaker advertises the ADD-PATH Capability with the "Send/Receive" field 330 set to either 2 or 3, and receives from its peer the ADD-PATH Capability with the Send/Receive field 330 set to either 1 or 3, for the corresponding <AFI, SAFI>.

A BGP speaker follows the procedures defined in RFC 4271 when generating an UPDATE message for a particular <AFI, SAFI> to a peer, unless the BGP speaker advertises the ADD-PATH Capability to the peer indicating its ability to send multiple paths for the <AFI, SAFI>, and also receives the ADD-PATH Capability from the peer indicating its ability to receive multiple paths for the <AFI, SAFI>, in which case the speaker must generate a route update for the <AFI, SAFI> based on the combination of the address prefix and the Path Identifier, and use the extended NLRI encodings specified in RFC 7911. The peer acts accordingly in processing an UPDATE message related to a particular <AFI, SAFI>.

A BGP speaker should include the best route when more than one path is advertised to a neighbor, unless it is a path received from that neighbor.

As the Path Identifiers 156 are locally assigned, and may or may not be persistent across a control plane restart of a BGP speaker, an implementation of RFC 7911 should ensure that the underlying forwarding plane of a "Receiving Speaker" is not affected during the graceful restart of a BGP session.

§ 1.2.3 Challenges when Advertising Multiple Paths for a Given Address Prefix Using BGP As should be appreciated from the foregoing, when using BGP, multiple routes can be advertised in a single UPDATE message only when such routes have the same set of path attribute value(s) (e.g., by including multiple prefixes in the NLRI field 150 of the UPDATE message or reported in the MP_REACH_NLRI path attribute 140'). This is because a BGP UPDATE message can advertise, at most, one set of path attributes, but multiple destinations, provided that the destinations share these attributes. The present inventor has realized that this can cause problems when advertising multiple paths for a given prefix in the context of RFC 7911.

Consider, for example, the network topology 400 of FIG. 4. In FIG. 4, assume that each router 420a-420e sends one million routes into the route reflector ("RR") 410. The RR 410 then uses BGP ADD-PATH to send five million routes to a router/BGP speaker 430 which receives the routes from RR 410 and configures BGP multipath. Since these BGP ADD-PATH routes usually have different protocol nexthops (next hop is a commonly used attribute), different routes for a single prefix will likely have different attribute values. Consequently, if the routes have different attributes, they must be sent in separate BGP UPDATE messages. Therefore, the routes could end up being spread out over multiple BGP UPDATES when being advertised. BGP speaker may attempt to send routes with same set of path attribute value(s) together, and it is more likely BGP routes from one route reflector client share some path attribute value(s). The route reflector RR 140 may reflect routes from one client and then send routes from the next client. Thus, the advertisement of multiple paths from different clients will be provided in UPDATE messages that are spread out widely for a big network.

§ 2. SUMMARY OF THE INVENTION

The present inventor has recognized that advertising multiple routes with different attributes for a given prefix in spread out BGP UPDATES is disadvantageous. For example, such spread out BGP UPDATES may cause additional calls to download routes to the forwarding information base ("FIB"), advertisement of new reachability information to peers, and/or multiple instances of multipath calculation when multipath is configured. Therefore, the present inventor has recognized that there is a need for procedures for avoid or at least minimize these problems.

The problems cause by advertising multiple routes with different attributes for a given prefix in spread out BGP UPDATES is solved by ordering BGP UPDATE messages using at least the destination prefix so that such UPDATE messages are sent more closely together than if the prefix were not considered. For example, the BGP UPDATES may be ordered such that they are not too "spread out." In one example embodiment consistent with the present invention, this may be accomplished by sending routes with the same prefix (but different sets of attribute value(s)) in adjacent BGP updates. In another example embodiment consistent with the present invention, this may be accomplished by sending routes with the same prefix (and the same set of attribute value(s)) in the same BGP UPDATE.

In some example embodiments consistent with the present invention, the control of sending BGP UPDATES when advertising multiple routes for the same prefix (such as under RFC 7911) is implemented solely by the BGP sender. Such example embodiments advantageously require no change to the protocol, yet benefit the BGP receiver.

In one example embodiment consistent with the present invention, route address prefix can be used to order the routes along with other information in the output data structure (e.g. tree), and a metric (path attribute value(s)) can be used to order the routes in second data structure with other information (e.g., a second tree). When BGP starts a new BGP update message, BGP can use the first data structure (e.g., the first tree) to select the first route to be included and then it can use the second data structure (e.g. the second tree) to "pack" routes with the same metric into the same BGP UPDATE. This example embodiment advantageously requires no change to the protocol, yet benefits the BGP receiver.

In another example embodiment consistent with the present invention, the NLRI encoding within a BGP UPDATE is extended to include the nexthop, along with its associated prefix. However, in this example embodiment, the BGP receiver must be capable of handling the extended NLRI, and this capability must (or at least should) be agreed to. (See, e.g., RFC 5492.)

In example embodiments consistent with the present invention, since BGP speaker can send multiple paths for the same prefix in UPDATES that are close enough, work by the BGP receiver will be reduced, and the routing information base ("RIB") learning rate should be improved.

§ 3. BRIEF DESCRIPTION OF THE DRAWINGS

FIG. 2 illustrates parts of extended NLRI encoding in accordance with RFC 7911.

FIG. 3 illustrates parts of conventional "capability" information.

FIG. 4 illustrates an example environment in which example embodiments consistent with the present invention may be used.

§ 4. DETAILED DESCRIPTION

§ 4.1 Definitions

Figures 1A, 1B:
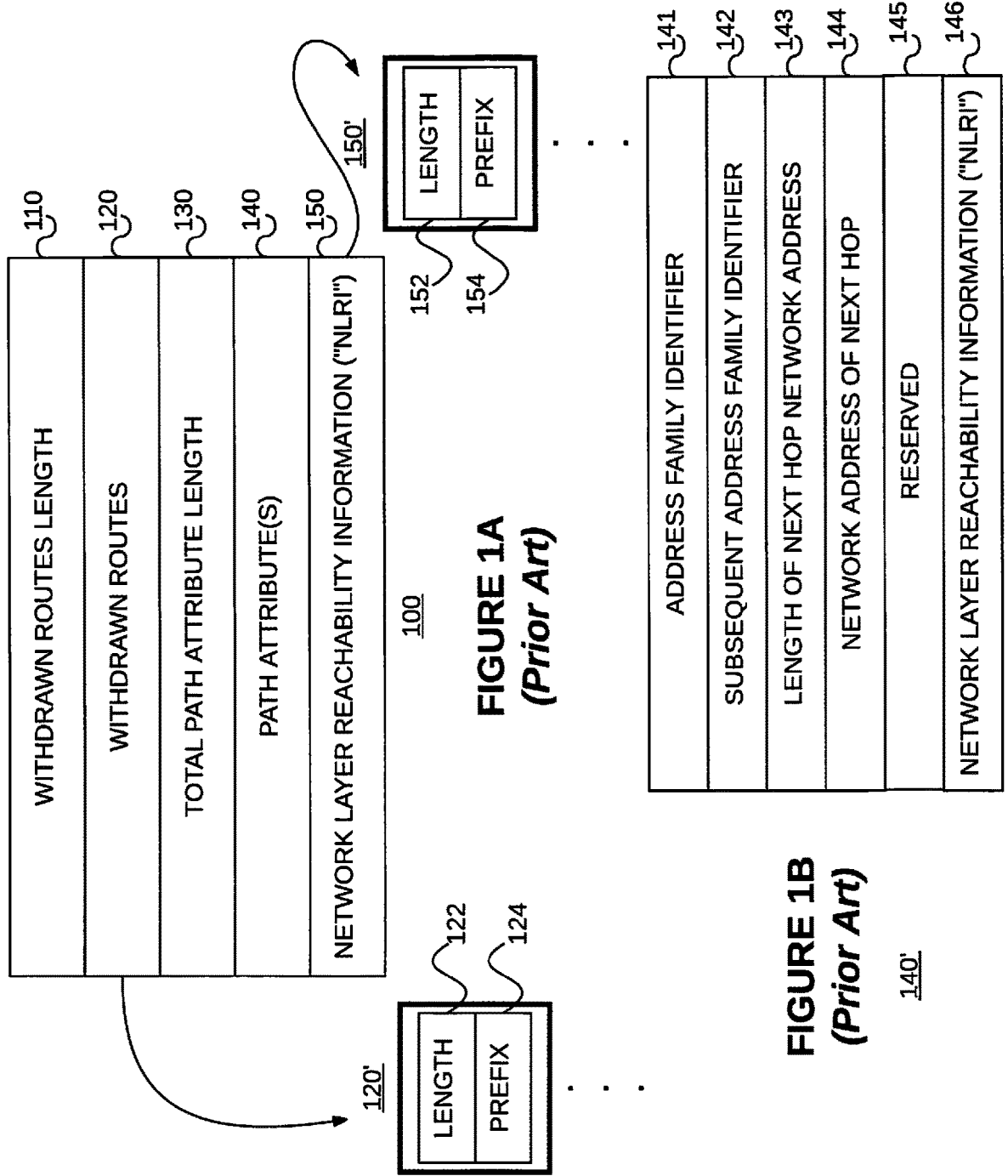
FIG. 1A illustrates parts of a conventional BGP UPDATE message.
FIG. 1B illustrates parts of a conventional MP_Reach_NLRI path attribute.

"Adj-RIB-In" contains unprocessed routing information that has been advertised to a local BGP speaker by its peer(s).

"Adj-RIB-Out" contains the routes for advertisement to specific peer(s) by means of the local speaker's UPDATE messages.

An "attribute" is a network metric, such as ORIGIN, AS_PATH, NEXT_HOP, LOCAL_PREF, etc. (See, e.g., RFC 4271.) In the following a value of an attribute, or values of a set of attributes, may be simply referred to as an attribute or a metric. Thus, different attributes may refer to an attribute having different values, or a set of attributes having at least one different value. Conversely, the same attribute may refer to an attribute having the same value, or a set of attributes having the same values. For example, if a path A has attribute AS_PATH=[1010 1011 I] and attribute LOCAL_PREF=100, while path B has attribute AS_PATH= [1010 1011 I] but attribute LOCAL_PREF=150, they have different sets of attribute values. As another example, if path A has attribute AS_PATH=[2010 2011 I} and attribute LOCAL_PREF=50, while path B has attribute AS_PATH= [2010 2011 I] and attribute LOCAL_PREF=50, they have the same set of attribute values. In a simple case, if path A has attribute LOCAL_PREF=80, while path B has attribute LOCAL_PREF=80, they have the same set of attribute value(s).

"Autonomous System ("AS")": The classic definition of an Autonomous System is a set of routers under a single technical administration, using an interior gateway protocol ("IGP") and common metrics to determine how to route packets within the AS, and using an inter-AS routing protocol to determine how to route packets to other ASes. Since this classic definition was developed, it has become common for a single AS to use several IGPs and, sometimes, several sets of metrics within an AS. The use of the term Autonomous System stresses the fact that, even when multiple IGPs and metrics are used, the administration of an AS appears to other ASes to have a single coherent interior routing plan, and presents a consistent picture of the destinations that are reachable through it.

"BGP Identifier": A 4-octet unsigned integer that indicates the BGP Identifier of the sender of BGP messages. A given BGP speaker sets the value of its BGP Identifier to an IP address assigned to that BGP speaker.

"BGP speaker": A router that implements BGP.

"External BGP (or "EBGP")": A BGP connection between external peers.

"External peer": A peer that is in a different Autonomous System ("AS") than the local system.

"Feasible route": An advertised route that is available for use by the recipient.

"Internal BGP (or IBGP")": A BGP connection between internal peers.

"Internal peer": A peer that is in the same Autonomous System as the local system.

"Interior Gateway Protocol (or "IGP")": A routing protocol used to exchange routing information among routers within a single Autonomous System (AS).

"Loc-RIB": A routing information base that contains the routes that have been selected by the local BGP speaker's Decision Process.

"NLRI": Network Layer Reachability Information.

"Prefix": part of an address that defines part of a communications network (e.g., a subnetwork), such as an Internet Protocol ("IP") network for example.

"Route": A unit of information that pairs an address prefix with the set of path attributes. The address prefix can be carried in the Network Layer Reachability Information ("NLRI") field of an UPDATE message or MP_REACH_NLRI attribute and the set of path attributes reported in the path attributes field of the same UPDATE message. In this application, "route" and "path" may be used interchangeably.

"RIB": Routing Information Base.

"Unfeasible route": A previously advertised feasible route that is no longer available for use.

§ 4.2 Example Environment

Example embodiments consistent with the present invention may be used in any communications protocol, and is particularly useful in communications protocols in which a given route update message can only carry routes having the same set of attribute value(s). For example, example embodiments consistent with the present invention may be used in a system having BGP speakers in which a BGP transmitter sends multiple routes (which may have different sets of attribute value(s)) for a given prefix. For example, these example embodiments consistent with the present invention maybe used in a route reflector BGP speaker, such as the one 410 illustrated in FIG. 4 above.

§ 4.3 Example Solutions

The problems cause by advertising multiple routes with different sets of attribute value(s) for a given prefix in spread out BGP UPDATES is solved by ordering BGP UPDATE messages using at least the route prefix so that such UPDATE messages are sent more closely together than if the prefix is not considered. For example, the BGP UPDATES may be ordered such that they are not too "spread out."

Figure 6:
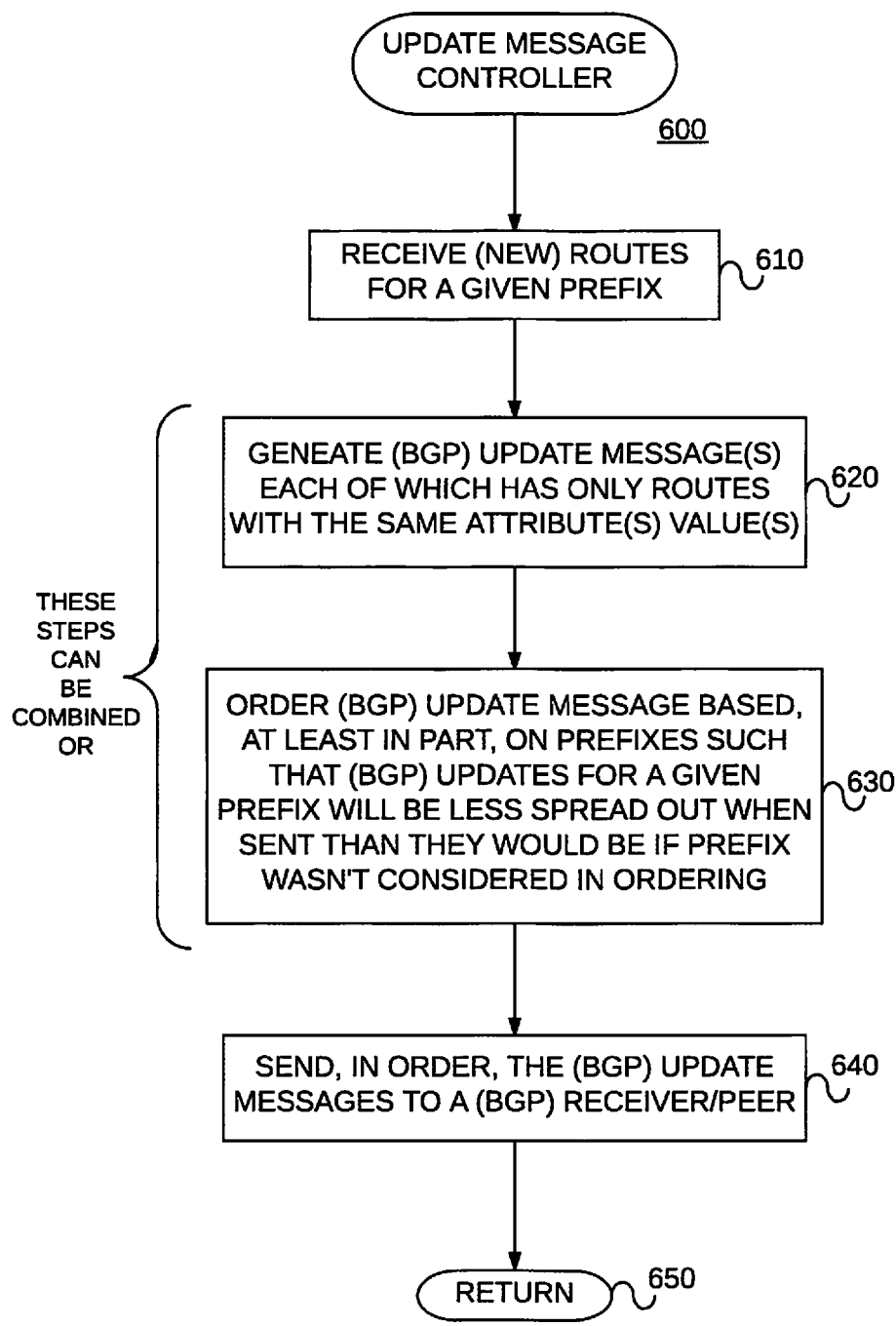
FIG. 6 illustrates an example method for controlling UPDATE messages, such as BGP UPDATE messages, in a manner consistent with the present invention.

FIG. 6 illustrates an example method 600 for generating and/or controlling UPDATE messages, such as BGP UPDATE messages, in a manner consistent with the present invention. First, routes (e.g., new routes) for a given prefix are received. (Block 610) Note that the new routes can be received from an external source, such as a BGP peer, or from a local source such as a local RIB for example. Next, UPDATE messages, each of which has only routes with the same set of attribute value(s), are generated. (Block 620) These UPDATE messages are then ordered, based, at least in part, on their associated prefixes such that the UPDATES for a given prefix will be less spread out when sent than they would otherwise be if prefix weren't considered when ordering. (Block 630) The UPDATE messages are then sent, in order, to a receiver/peer (Block 640) before the method 600 is left (Node 650). Note that steps 620 can be combined (e.g., interlaced). Note that Blocks 620 and 630 can be combined.

Two more specific example solutions are described in §§ 4.3.1 and 4.3.2 below.

§ 4.3.1 First Example Solution: Sending Multiple Routes with the Same Prefix Using Adjacent BGP Update Messages (or the Same BGP Update Message if Different Routes for the Same Prefix have the Same Set of Attribute Value(S))

In one example embodiment consistent with the present invention, generating and ordering BGP UPDATE messages using at least the route prefix so that such message are sent more closely together than if the prefix is not considered is accomplished by sending routes with the same prefix (but different sets of attribute value(s)) in adjacent BGP updates. In another example embodiment consistent with the present invention, this may be accomplished by sending routes with the same prefix (and the same set of attribute value(s)) in the same BGP UPDATE.

Figure 7:
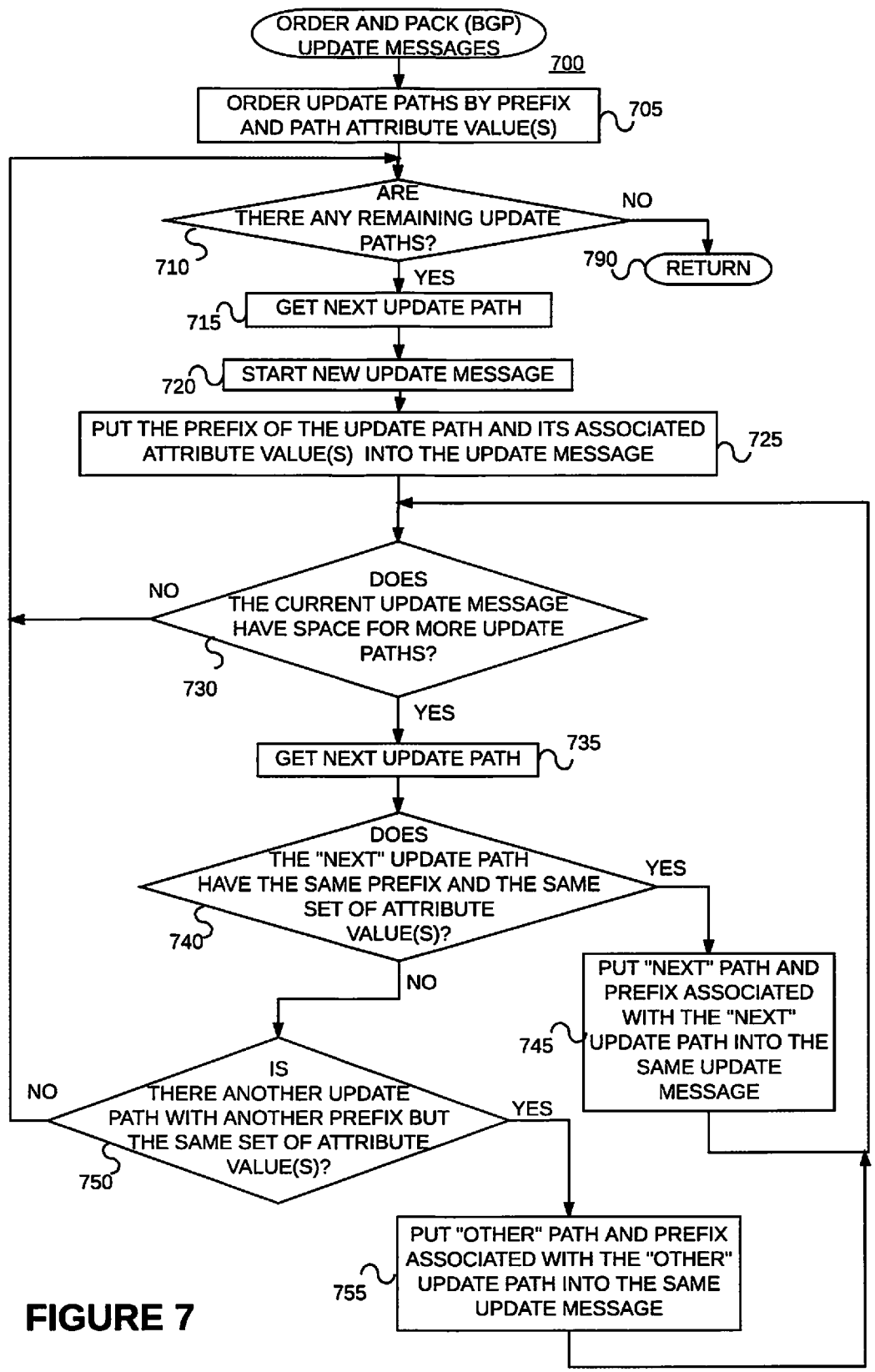
FIG. 7 illustrates an example method for ordering and packing UPDATE messages, such as BGP UPDATE messages, in a manner consistent with the present invention.

Referring back to blocks 620 and 630 of FIG. 6, FIG. 7 illustrates an example method 700 for ordering and generating (e.g., packing) UPDATE messages, such as BGP UPDATE messages, in a manner consistent with this first example solution. The UPDATE paths may be ordered based on prefix and path attribute value(s) (Block 705). If there are any remaining update paths (used interchangeably with "update routes"), the example method 700 continues (Decision 710, YES), otherwise the method 700 is left (Decision 710, NO and RETURN node 790). If there is a remaining update path, it is retrieved (Block 715) and a new update message is started (Block 720). The update path's prefix and its associated attribute value(s) are put into the update message. (Block 725) Then, it is determined whether or not the current update message has space for more update path(s). (Decision 730) If not, the example method 700 branches back to decision block 710, already discussed above. (Decision 730, NO) If, on the other hand, it is determined that the current update message does have space for more update path(s), the next (not yet processed and placed) update path (assuming one exists) is retrieved. (Decision 730, YES, and block 735) If this "next" update path has the same prefix and the same set of attribute value(s), it and its associated prefix are put into the same update message, and the example method 700 branches back to decision 730. (Decision 740, YES, and block 745) If, on the other hand, this "next" update path does not have the same prefix and the same set of attribute value(s), (Decision 740, NO), then it is determined whether or not there is another (not yet processed and placed) update path with another prefix but the same set of attribute value(s). (Decision 750) If so, the "other" path and its corresponding prefix are placed into the same update message, before the example method 700 branches back to decision 730. (Decision 750, YES, and block 755) Otherwise, the example method 700 branches back to decision 710. (Decision 750, NO) Note that the generated update message should be sent in the order that they were generated (or as they are generated), unless some other factor(s) are used to control their ordering.

Consider, for example, the following scenario:

| Prefix 1 | path 1 | attribute value set A |
|---|---|---|
|  | path 2 | attribute value set A |
|  | path 3 | attribute value set B |
| Prefix 2 | path 1 | attribute value set C |
|  | path 4 | attribute value set D |
| Prefix 3 | path 5 | attribute value set C |
| Prefix 4 | path 1 | attribute value set C |
|  | path 6 | attribute value set A |

In the example method 700 of FIG. 7, a first UPDATE message would include:
Prefix 1, path 1, attribute set A
Prefix 1, path 2, attribute set A
Prefix 4, path 6, attribute set A.
The next UPDATE message would include:
Prefix 1, path 3, attribute set B
The next UPDATE message would include:
Prefix 2, path 1, attribute value set C
Prefix 3, path 5, attribute value set C
Prefix 4, path 1, attribute value set C
The last UPDATE message would include:
Prefix 2, path 4, attribute value set D.
Note in the foregoing example, that each UPDATE message include only paths having the same set of attribute value(s), and that paths associated with the same prefix are included in the same or adjacent UPDATE messages (that is, in compliance with the BGP protocol, and more closely spaced than they would otherwise be if prefix were not considered). Although not shown, other factors can be considered as well. For example, the "time" field if a delay has been configured using the BGP has update delay feature.

Data structures (e.g., one or more trees) may be used to order the update paths by prefix and/or attribute value(s).

Figure 5:
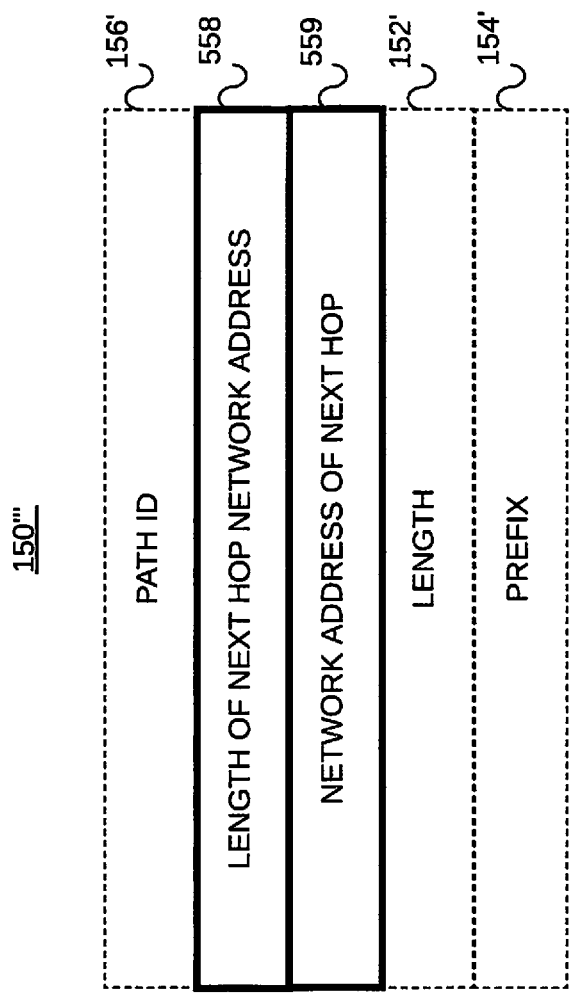
FIG. 5 illustrates example extended NLRI consistent with the present invention.

§ 4.3.2 Second Example Solution: Extending Nlri Encoding to Include the Next Hop In a second example, solution, NLRI encoding is extended to include the nexthop. For example, NLRI could be extended 150 or 146''' as shown in FIG. 5. Referring to both FIGS. 2 and 5, the path ID field 156', length field 152' and prefix field 154' may be the same as the corresponding fields (156, 152 and 154) in FIG. 2. The extended NLRI 150''' further includes a length of next hop network address field 558 and a network address of next hop field 559 If length of nexthop is greater than zero for a given prefix in the extended NLRI field, NEXT_HOP attribute will be ignored for that prefix. Otherwise, NEXT_HOP attribute will be used for the prefix. If all prefix in the update message have their own defined nexthop, NEXT_HOP path attribute may not be present with the BGP update message.

Referring to field 558, when BGP advertises routes using an MP_ReachNLRI attribute, if the length of nexthop is greater than zero for a given prefix in the extended NLRI field, and the nexthop information defined in field 143 and 144 of MP_Reach_NLRI will be ignored for that prefix. Otherwise, the nexthop information defined in field 143 and 144 of MP_Reach_NLRI will be used for the prefix. If all the prefix(es) in the MP_Reach_NLRI message have their own defined nexthop, the length of the nexthop defined in field 143 and 144 may be zero. In this example extended NLRI format 150''', the next hop information 559 is included along with the prefix 154'.

Figure 8:
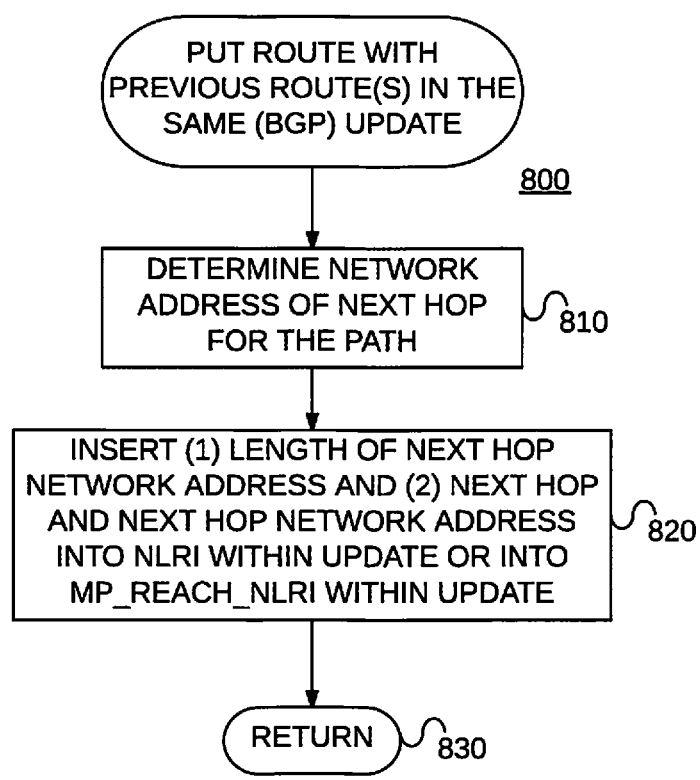
FIG. 8 illustrates an example method for putting a route with previous routes (with the same prefix and the same set of attribute value(s)) in a single UPDATE message, such as in a single BGP UPDATE message.

FIG. 8 illustrates an example method 800 for putting a path with previous path(s) (with the same set of attribute value(s)) in a single UPDATE message, such as in a single BGP UPDATE message. The network address of the next hop for the UPDATE path is determined (Block 810), and both (1) the length of the next hop network address and (2) the next hop network address are inserted into the extended NLRI, or into the MP_Reach_NLRI with the extended NLRI field (Block 820), before the method 800 is left (Node 830).

If BGP advertises Internet Protocol version 4 (IPv4) unicast reachability using Network Layer Reachability Information ("NLRI") field, the foregoing example extended NLRI format 150''' could be used, but without the next hop attribute. Note that the MP_Reach_NLRI path attribute may have a zero nexthop length in field 143 in such a case.

Unlike the first example solution in which the protocol does not need to be extended (and the BGP receiver can benefit by the BGP sender controlling its BGP UPDATES), in this second example solution, the BGP speakers need to (or at least should) exchange capability before they can use the foregoing Extended NLRI encoding to exchange routing information. The new Capability is a BGP capability (See, e.g., RFC 5492, incorporated herein by reference), with a new "Capability" code (to be assigned by IANA). The Capability Length field of this capability may be variable. The Capability Value field may include one or more <address family, subsequent address family, send/receive> tuples. (Similar to FIG. 3, described above.) More specifically, the meaning and use of the fields are as follows. The Address Family Identifier ("AB") field is the same as the one used in RFC 4760 (incorporated herein by reference). The Subsequent Address Family Identifier ("SAFI") is the same as the one used in RFC 4760. Finally, the Send/Receive field indicates whether, for the <AFI, SAFI>, the sender is: (a) able to receive (but not send) Extended NLRI encoding (value=1); (b) able to send (but not receive and process) Extended NLRI encoding to its peer (value=2); or (c) can both send and receive (value=3). If any other value is received in the Send/Receive field, then the capability should be treated as not understood and ignored. (See, e.g., RFC 5492.)

A BGP speaker that wishes to indicate support for multiple AFI/SAFIs may do so by including the information in a single instance of the Capability.

§ 4.4 Example Apparatus

Figure 9:
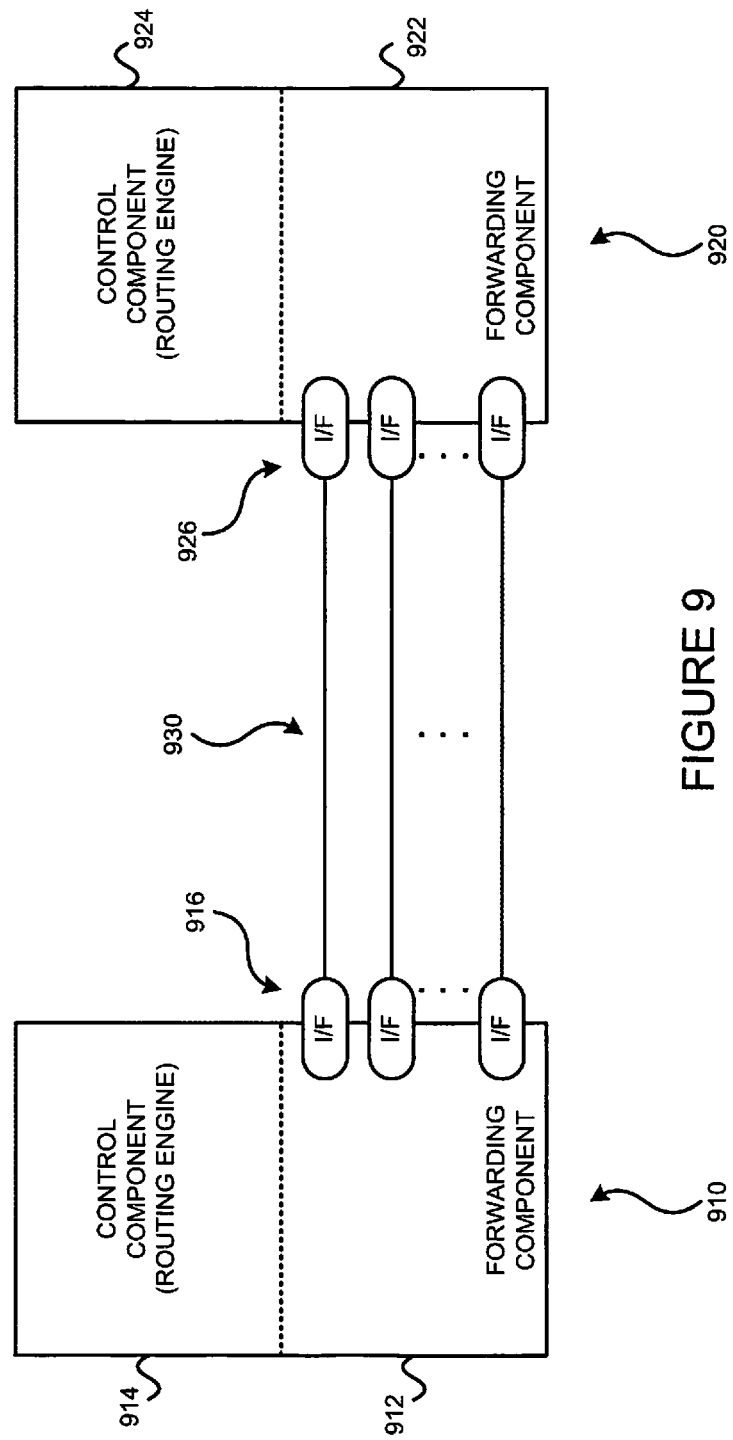
FIG. 9 illustrates an example environment including two systems coupled via communications links.

FIG. 9 illustrates two data forwarding systems 910 and 920 coupled via communications links 930. The links 930 may be physical links and/or "wireless" links. The data forwarding systems 910,920 may be routers for example. If the data forwarding systems 910,920 are example routers, each may include a control component (e.g., a routing engine) 914,924 and a forwarding component 912,922. Each data forwarding system 910,920 includes one or more interfaces 916,926 that terminate each of the one or more communications links 930.

As just discussed above, and referring to FIG. 10, some example routers 1000 include a control component (e.g., routing engine) 1010 and a packet forwarding component (e.g., a packet forwarding engine) 1090.

The control component 1010 may include an operating system (OS) kernel 1020, routing protocol process(es) 1030, label-based forwarding protocol process(es) 1040, interface process(es) 1050, user interface (e.g., command line interface) process(es) 1060, and chassis process(es) 1070, and may store routing table(s) 1039, label forwarding information 1045, and forwarding (e.g., route-based and/or label-based) table(s) 1080. As shown, the routing protocol process(es) 1030 may support routing protocols such as the routing information protocol ("RIP") 1031, the intermediate system-to-intermediate system protocol ("IS-IS") 1032, the open shortest path first protocol ("OSPF") 1033, the enhanced interior gateway routing protocol ("EIGRP") 1034 and the boarder gateway protocol ("BGP") 1035, and the label-based forwarding protocol process(es) 1040 may support protocols such as BGP 1035, the label distribution protocol ("LDP") 1036 and the resource reservation protocol ("RSVP") 1037. One or more components (not shown) may permit a user 1065 to interact with the user interface process(es) 1060. Similarly, one or more components (not shown) may permit an external device to interact with one or more of the routing protocol process(es) 1030, the label-based forwarding protocol process(es) 1040, the interface process(es) 1050, and the chassis process(es) 1070 (e.g., via SNMP 1085), and such processes may send information to an external device (e.g., via SNMP 1085).

The packet forwarding component 1090 may include a microkernel 1092, interface process(es) 1093, distributed ASICs 1094, chassis process(es) 1095 and forwarding (e.g., route-based and/or label-based) table(s) 1096.

Figure 10:
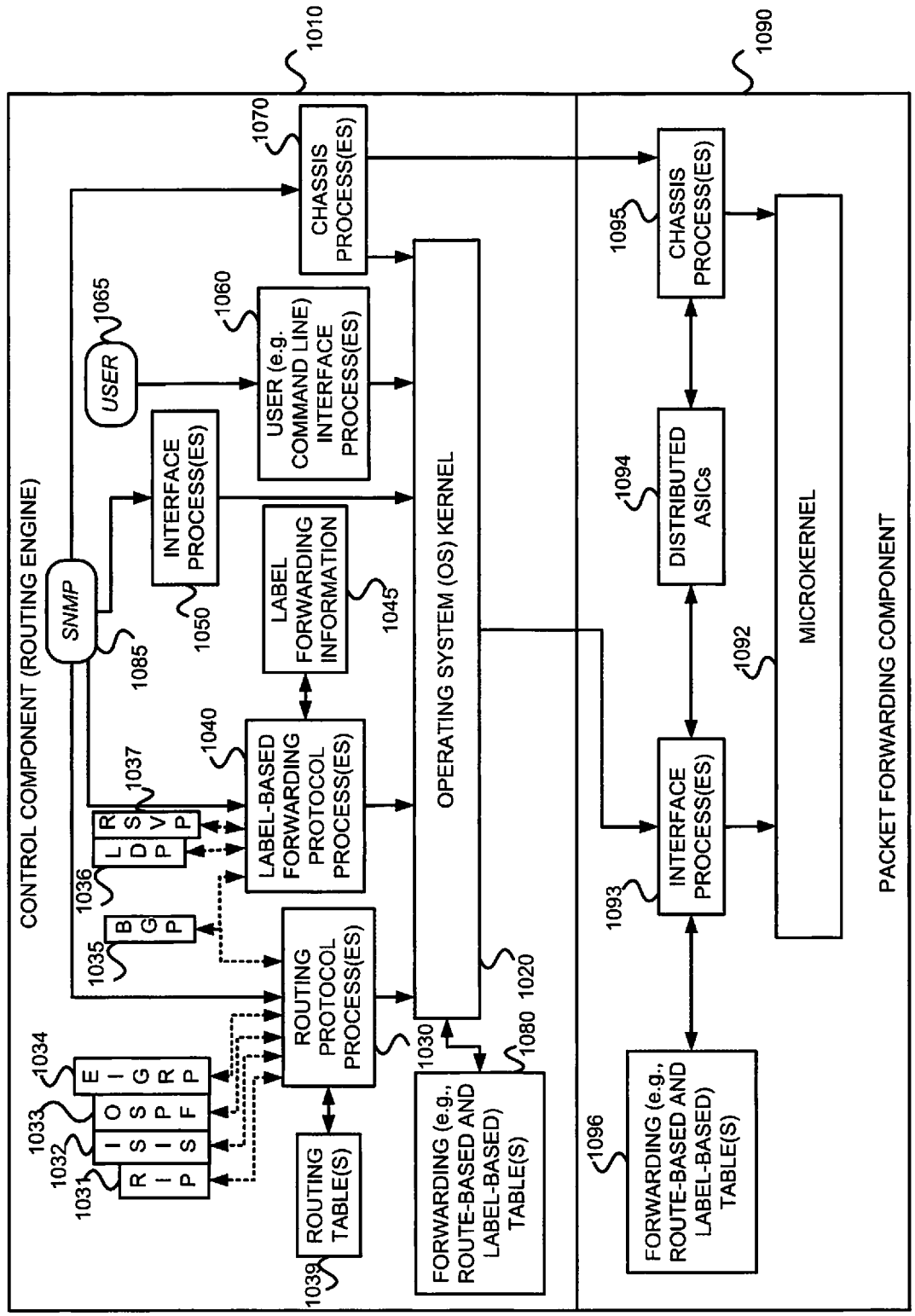
FIG. 10 is a block diagram of an example router on which the present invention may be implemented.

In the example router 1000 of FIG. 10, the control component 1010 handles tasks such as performing routing protocols, performing label-based forwarding protocols, control packet processing, etc., which frees the packet forwarding component 1090 to forward received packets quickly. That is, received control packets (e.g., routing protocol packets and/or label-based forwarding protocol packets) are not fully processed on the packet forwarding component 1090 itself, but are passed to the control component 1010, thereby reducing the amount of work that the packet forwarding component 1090 has to do and freeing it to process packets to be forwarded efficiently. Thus, the control component 1010 is primarily responsible for running routing protocols and/or label-based forwarding protocols, maintaining the routing tables and/or label forwarding information, sending forwarding table updates to the packet forwarding component 1090, and performing system management. The example control component 1010 may handle routing protocol packets, provide a management interface, provide configuration management, perform accounting, and provide alarms. The processes 1030, 1040, 1050, 1060 and 1070 may be modular, and may interact with the OS kernel 1020. That is, nearly all of the processes communicate directly with the OS kernel 1020. Using modular software that cleanly separates processes from each other isolates problems of a given process so that such problems do not impact other processes that may be running. Additionally, using modular software facilitates easier scaling.

Still referring to FIG. 10, the example OS kernel 1020 may incorporate an application programming interface ("API") system for external program calls and scripting capabilities. The control component 1010 may be based on an Intel PCI platform running the OS from flash memory, with an alternate copy stored on the router's hard disk. The OS kernel 1020 is layered on the Intel PCI platform and establishes communication between the Intel PCI platform and processes of the control component 1010. The OS kernel 1020 also ensures that the forwarding tables 1096 in use by the packet forwarding component 1090 are in sync with those 1080 in the control component 1010. Thus, in addition to providing the underlying infrastructure to control component 1010 software processes, the OS kernel 1020 also provides a link between the control component 1010 and the packet forwarding component 1090.

Referring to the routing protocol process(es) 1030 of FIG. 10, this process(es) 1030 provides routing and routing control functions within the platform. In this example, the RIP 1031, ISIS 1032, OSPF 1033 and EIGRP 1034 (and BGP 1035) protocols are provided. Naturally, other routing protocols may be provided in addition, or alternatively. Similarly, the label-based forwarding protocol process(es) 1040 provides label forwarding and label control functions. In this example, the LDP 1036 and RSVP 1037 (and BGP 1035) protocols are provided. Naturally, other label-based forwarding protocols (e.g., MPLS) may be provided in addition, or alternatively. In the example router 1000, the routing table(s) 1039 is produced by the routing protocol process(es) 1030, while the label forwarding information 1045 is produced by the label-based forwarding protocol process(es) 1040.

Still referring to FIG. 10, the interface process(es) 1050 performs configuration of the physical interfaces (Recall, e.g., 916 and 926 of FIG. 9) and encapsulation.

The example control component 1010 may provide several ways to manage the router. For example, it 1010 may provide a user interface process(es) 1060 which allows a system operator 1065 to interact with the system through configuration, modifications, and monitoring. The SNMP 1085 allows SNMP-capable systems to communicate with the router platform. This also allows the platform to provide necessary SNMP information to external agents. For example, the SNMP 1085 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1010, thereby avoiding slowing traffic forwarding by the packet forwarding component 1090.

Although not shown, the example router 1000 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provides interaction with a command line interface ("CLI") 1060 via a console port, an auxiliary port, and/or a management Ethernet port The packet forwarding component 1090 is responsible for properly outputting received packets as quickly as possible. If there is no entry in the forwarding table for a given destination or a given label and the packet forwarding component 1090 cannot perform forwarding by itself, it 1090 may send the packets bound for that unknown destination off to the control component 1010 for processing. The example packet forwarding component 1090 is designed to perform Layer 2 and Layer 3 switching, route lookups, and rapid packet forwarding.

As shown in FIG. 10, the example packet forwarding component 1090 has an embedded microkernel 1092, interface process(es) 1093, distributed ASICs 1094, and chassis process(es) 1095, and stores a forwarding (e.g., route-based and/or label-based) table(s) 1096. The microkernel 1092 interacts with the interface process(es) 1093 and the chassis process(es) 1095 to monitor and control these functions. The interface process(es) 1092 has direct communication with the OS kernel 1020 of the control component 1010. This communication includes forwarding exception packets and control packets to the control component 1010, receiving packets to be forwarded, receiving forwarding table updates, providing information about the health of the packet forwarding component 1090 to the control component 1010, and permitting configuration of the interfaces from the user interface (e.g., CLI) process(es) 1060 of the control component 1010. The stored forwarding table(s) 1096 is static until a new one is received from the control component 1010. The interface process(es) 1093 uses the forwarding table(s) 1096 to look up nexthop information. The interface process(es) 1093 also has direct communication with the distributed ASICs 1094. Finally, the chassis process(es) 1095 may communicate directly with the microkernel 1092 and with the distributed ASICs 1094.

Figure 11:
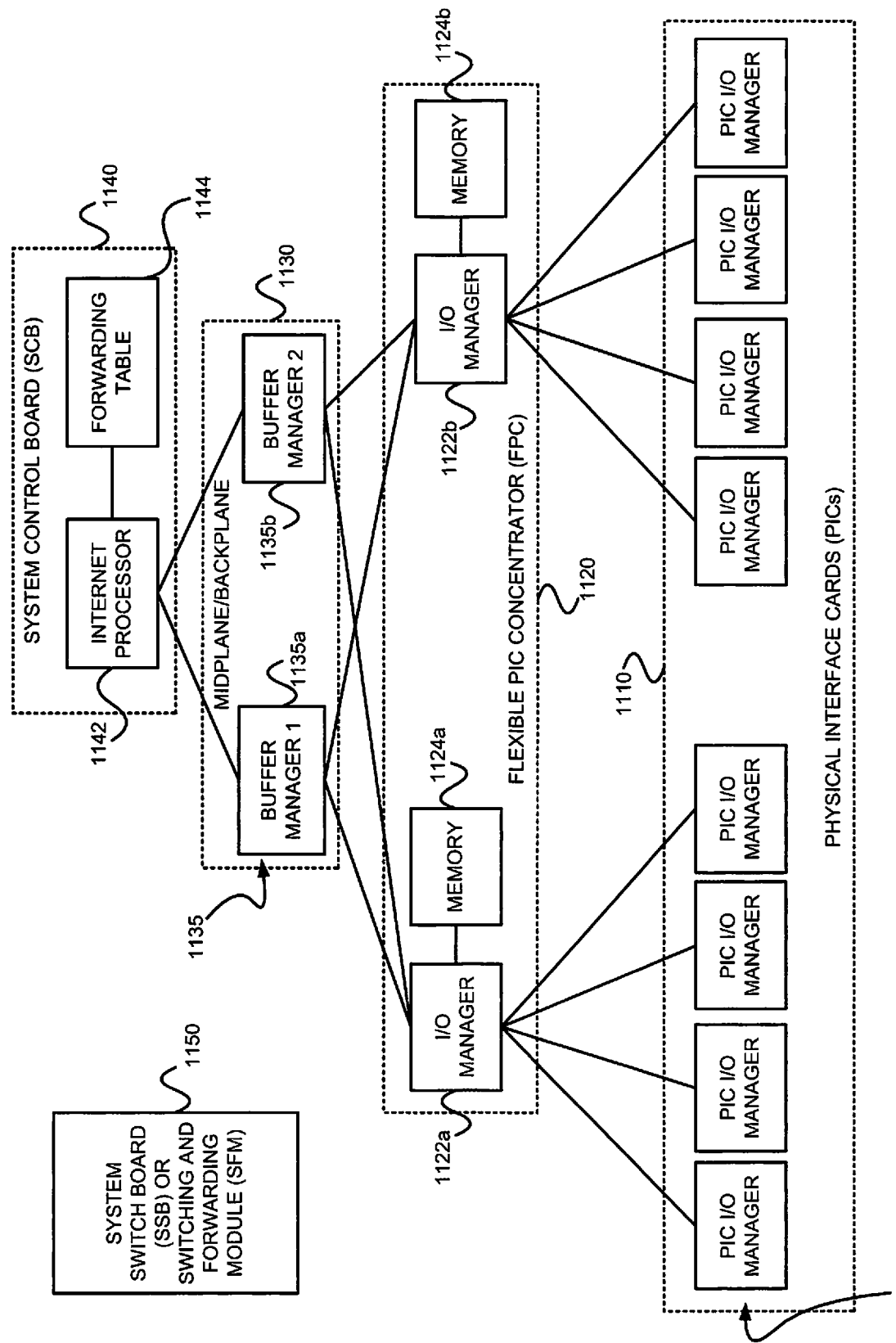
FIG. 11 is a block diagram of example distributed application specific integrated circuits ("ASICs") that may be provided in the example router of FIG. 10.

Referring back to distributed ASICs 1094 of FIG. 10, FIG. 11 is an example of how the ASICS may be distributed in the packet forwarding component 1090 to divide the responsibility of packet forwarding. As shown in FIG. 11, the ASICs of the packet forwarding component 1090 may be distributed on physical interface cards (PICs) 1110, flexible PIC concentrators (FPCs) 1120, a midplane or backplane 1130, and a system control board(s) 1140 (for switching and/or forwarding). Switching fabric is also shown as a system switch board (SSB), or a switching and forwarding module (SFM) 1150. Each of the PICs 1110 includes one or more PIC I/O managers 1115. Each of the FPCs 1120 includes one or more I/O managers 1122, each with an associated memory 1124. The midplane/backplane 1130 includes buffer managers 1135a, 1135b. Finally, the system control board 1140 includes an Internet processor 1142 and an instance of the forwarding table 1144 (Recall, e.g., 1096 of FIG. 10).

Still referring to FIG. 11, the PICs 1110 contain the interface ports. Each PIC 1110 may be plugged into an FPC 1120. Each individual PIC 1110 may contain an ASIC that handles media-specific functions, such as framing or encapsulation. Some example PICs 1110 provide SDH/SONET, ATM, Gigabit Ethernet, Fast Ethernet, and/or DS3/E3 interface ports.

An FPC 1120 can contain from one or more PICs 1110, and may carry the signals from the PICs 1110 to the midplane/backplane 1130 as shown in FIG. 11.

The midplane/backplane 1130 holds the line cards. The line cards may connect into the midplane/backplane 1130 when inserted into the example router's chassis from the front. The control component (e.g., routing engine) 1010 may plug into the rear of the midplane/backplane 1130 from the rear of the chassis. The midplane/backplane 1130 may carry electrical (or optical) signals and power to each line card and to the control component 1010.

The system control board 1140 may perform forwarding lookup. It 1140 may also communicate errors to the routing engine. Further, it 1140 may also monitor the condition of the router based on information it receives from sensors. If an abnormal condition is detected, the system control board 1140 may immediately notify the control component 1010.

Figure 12A:
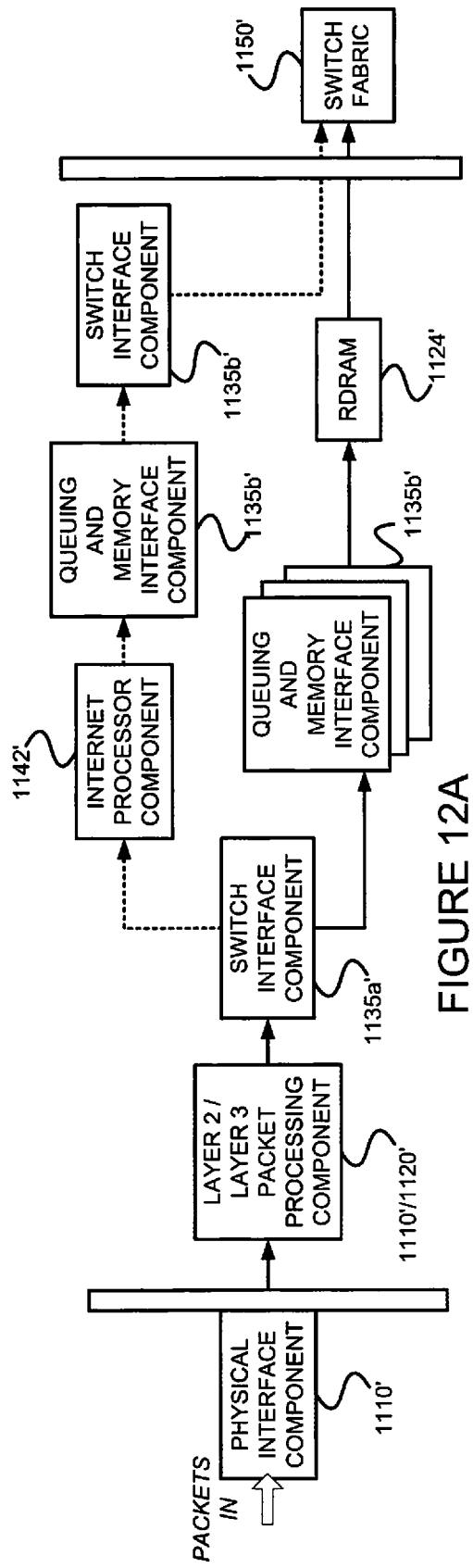
FIGS. 12A and 12B illustrate example packet forwarding operations of the example distributed ASICs of FIG. 11.
Figure 12B:
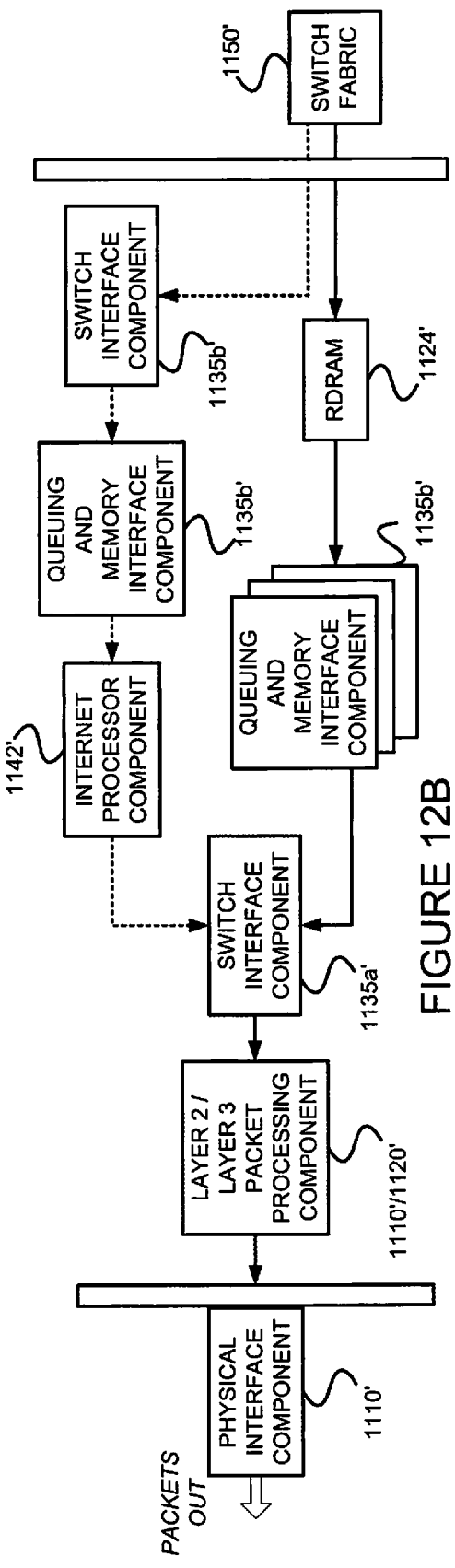

Referring to FIGS. 11, 12A and 12B, in some exemplary routers, each of the PICs 1110,610' contains at least one I/O manager ASIC 1115 responsible for media-specific tasks, such as encapsulation. The packets pass through these I/O ASICs on their way into and out of the router. The I/O manager ASIC 1115 on the PIC 1110,1110' is responsible for managing the connection to the I/O manager ASIC 1122 on the FPC 1120,1120', managing link-layer framing and creating the bit stream, performing cyclical redundancy checks ("CRCs"), and detecting link-layer errors and generating alarms, when appropriate. The FPC 1120 includes another I/O manager ASIC 1122. This ASIC 1122 takes the packets from the PICs 1110 and breaks them into (e.g., 114-byte) memory blocks. This FPC I/O manager ASIC 1122 sends the blocks to a first distributed buffer manager (DBM) 1135a', decoding encapsulation and protocol-specific information, counting packets and bytes for each logical circuit, verifying packet integrity, and applying class of service ("CoS") rules to packets. At this point, the packet is first written to memory. More specifically, the example DBM ASIC 1135a' manages and writes packets to the shared memory 1124 across all FPCs 1120. In parallel, the first DBM ASIC 1135a' also extracts information on the destination of the packet and passes this forwarding-related information to the Internet processor 1142/1142'. The Internet processor 1142/1142' performs the route lookup using the forwarding table 1144 and sends the information over to a second DBM ASIC 1135b'. The Internet processor ASIC 1142/642' also collects exception packets (i.e., those without a forwarding table entry) and sends them to the control component 1010. The second DBM ASIC 1135b' then takes this information and the 114-byte blocks and forwards them to the I/O manager ASIC 1122 of the egress FPC 1120/1120' (or multiple egress FPCs, in the case of multicast) for reassembly. (Thus, the DBM ASICs 1135a' and 1135b' are responsible for managing the packet memory 1124 distributed across all FPCs 1120/1120', extracting forwarding-related information from packets, and instructing the FPC where to forward packets.)

The I/O manager ASIC 1122 on the egress FPC 1120/1120' may perform some value-added services. In addition to incrementing time to live (TTL) values and re-encapsulating the packet for handling by the PIC 1110, it can also apply class-of-service ("CoS") rules. To do this, it may queue a pointer to the packet in one of the available queues, each having a share of link bandwidth, before applying the rules to the packet. Queuing can be based on various rules. Thus, the I/O manager ASIC 1122 on the egress FPC 1120/1120' may be responsible for receiving the blocks from the second DBM ASIC 1135b', incrementing TTL values, queuing a pointer to the packet, if necessary, before applying CoS rules, re-encapsulating the blocks, and sending the encapsulated packets to the PIC I/O manager ASIC 1115.

Figure 13:
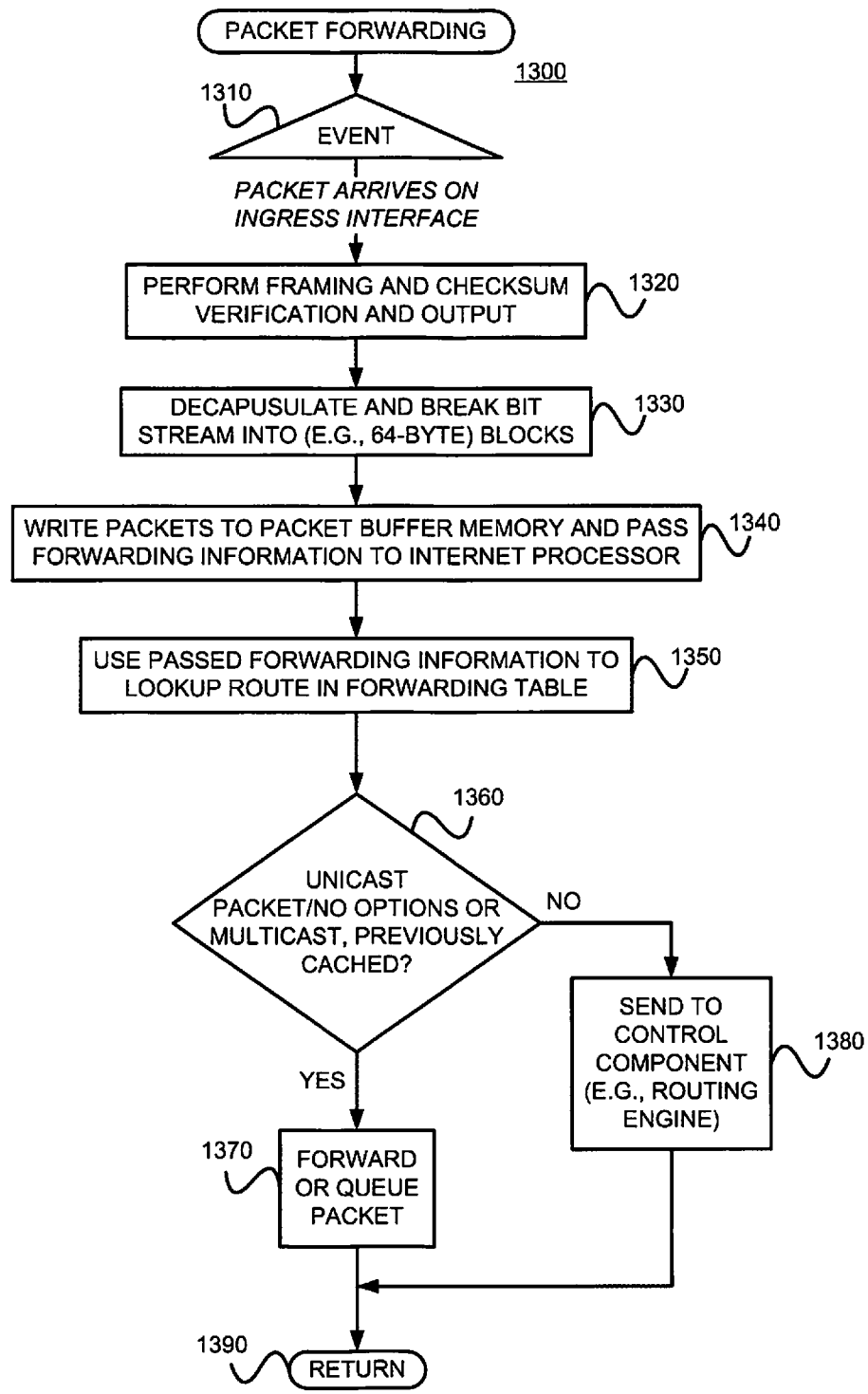
FIG. 13 is a flow diagram of an example packet forwarding method that may be implemented on any of the example routers of FIGS. 10 and 11.

FIG. 13 is a flow diagram of an example method 1300 for providing packet forwarding in the example router. The main acts of the method 1300 are triggered when a packet is received on an ingress (incoming) port or interface. (Event 1310) The types of checksum and frame checks that are required by the type of medium it serves are performed and the packet is output, as a serial bit stream. (Block 1320) The packet is then decapsulated and parsed into (e.g., 64-byte) blocks. (Block 1330) The packets are written to buffer memory and the forwarding information is passed on the Internet processor. (Block 1340) The passed forwarding information is then used to lookup a route in the forwarding table. (Block 1350) Note that the forwarding table can typically handle unicast packets that do not have options (e.g., accounting) set, and multicast packets for which it already has a cached entry. Thus, if it is determined that these conditions are met (YES branch of Decision 1360), the packet forwarding component finds the next hop and egress interface, and the packet is forwarded (or queued for forwarding) to the next hop via the egress interface (Block 1370) before the method 1300 is left (Node 1390) Otherwise, if these conditions are not met (NO branch of Decision 1360), the forwarding information is sent to the control component 1010 for advanced forwarding resolution (Block 1380) before the method 1300 is left (Node 1390).

Referring back to block 1370, the packet may be queued. Actually, as stated earlier with reference to FIG. 11, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1122 may send a request for the packet to the second DBM ASIC 1135b. The DBM ASIC 1135 reads the blocks from shared memory and sends them to the I/O manager ASIC 1122 on the FPC 1120, which then serializes the bits and sends them to the media-specific ASIC of the egress interface. The I/O manager ASIC 1115 on the egress PIC 1110 may apply the physical-layer framing, perform the CRC, and send the bit stream out over the link.

Referring back to block 1380 of FIG. 13, as well as FIG. 11, regarding the transfer of control and exception packets, the system control board 1140 handles nearly all exception packets. For example, the system control board 1140 may pass exception packets to the control component 1010.

Although example embodiments consistent with the present invention may be implemented on the example routers of FIG. 9 or 10 (Note, especially, the control components 914 and 924 of FIG. 9 and the routing protocols 1030, 1035 and 1036 of FIG. 10), embodiments consistent with the present invention may be implemented on communications network nodes (e.g., routers, switches, route reflectors, BGP speakers, etc.) having different architectures. More generally, embodiments consistent with the present invention may be implemented on an example system 1400 as illustrated on FIG. 14.

Figure 14:
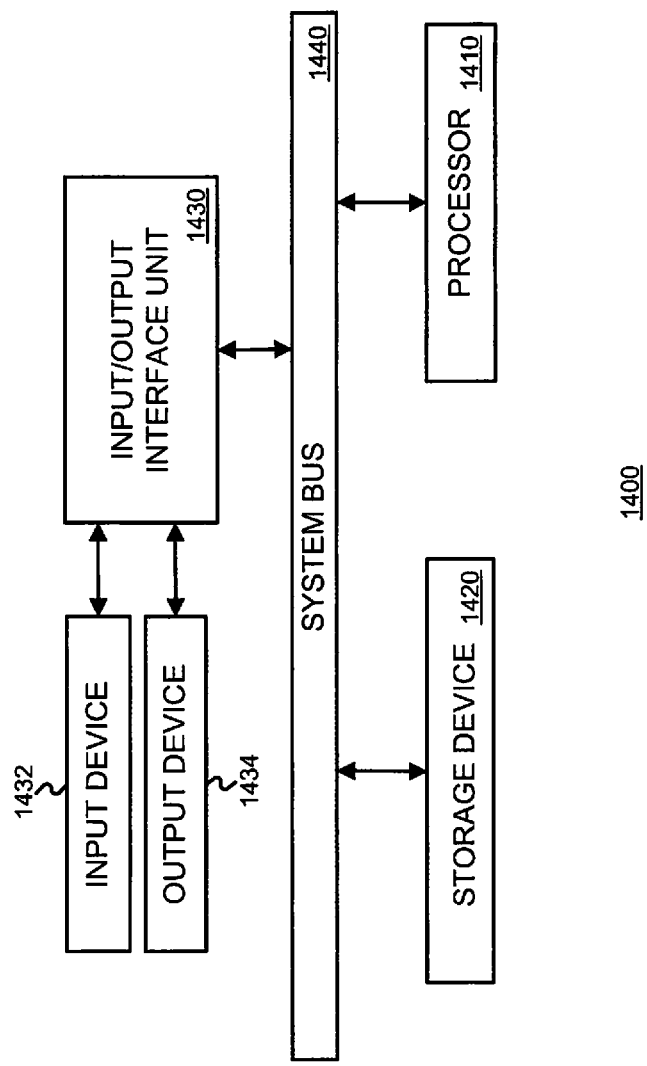
FIG. 14 is a block diagram of an example processor-based system that may be used to execute the example methods for controlling UPDATE messages and/or to store information used and/or generated by such example methods.

FIG. 14 is a block diagram of an exemplary machine 1400 that may perform one or more of the processes described, and/or store information used and/or generated by such processes. The exemplary machine 1400 includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions to effect one or more aspects of the present invention. At least a portion of the machine executable instructions may be stored (temporarily or more permanently) on the one or more storage devices 1420 and/or may be received from an external source via one or more input interface units 1430. The machine executable instructions may be stored as various software modules, each module performing one or more operations. Functional software modules are examples of components of the invention.

In some embodiments consistent with the present invention, the processors 1410 may be one or more microprocessors and/or ASICs. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present invention might be implemented in hardware, such as one or more field programmable gate arrays ("FPGA"s), one or more integrated circuits such as ASICs, one or more network processors, etc. Alternatively, or in addition, embodiments consistent with the present invention might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 Conclusions

In example embodiments consistent with the present invention, since a BGP speaker can send multiple paths for the same prefix in UPDATES that are close enough, work by the BGP receiver will be reduced, and the routing information base ("RIB") learning rate should be improved. For example, the BGP receiver may run a background job to process the routes to achieve state compression benefit. In this way, performance can be improved when the BGP sender sends the multiple paths for the same prefix more closely than it would if prefix weren't considered.

Although many of the example embodiments were described in the context of the BGP protocol, it may be extended to other protocols.

What is claimed is:

1. A computer-implemented method for advertising multiple paths for a given prefix which provides at least a part of an address that defines a part of a communications network, the computer-implemented method comprising:
   a) generating, with a device, an ordered set of communications control messages, each of which communications control messages includes one or more paths, wherein each of the one or more paths included in each communications control message has the same set of attribute values, wherein the ordered set of communications control messages are generated and an order is determined using at least a prefix of the one or more paths included in each communications control message so that such communications control messages for a given prefix are sent more closely together than if the prefix were not considered; and
   b) sending, in the determined order, with the device, the ordered set of communications control messages to a receiver peer device.

2. The computer-implemented method of claim 1 wherein the communications control messages are border gateway protocol (BGP) communications control messages.

3. The computer-implemented method of claim 1 wherein the act of generating an ordered set of communications control messages is performed such that paths with the same prefix but a different set of attribute values are sent to the receiver peer device in adjacent communications control messages.

4. The computer-implemented method of claim 3 wherein the communications control messages are border gateway protocol (BGP) communications control messages.

5. The computer-implemented method of claim 1 wherein the act of generating an ordered set of communications control messages packs paths with the same prefix and the same set of attribute values in a single communications control message.

6. The computer-implemented method of claim 5 wherein the communications control messages are border gateway protocol (BGP) communications control messages.

7. The computer-implemented method of claim 1 wherein the device is a BGP sender.

8. The computer-implemented method of claim 1 wherein the communications control messages are border gateway protocol (BGP) communications control messages, and wherein network layer reachability information (NLRI) included within each BGP communications control message is extended to include a nexthop, along with its associated prefix.

9. The computer-implemented method of claim 8 wherein the device is a BGP sender, wherein the receiver peer device is a BGP receiver, and wherein the BGP sender further confirms that the BGP receiver is capable of handling the extended NLRI.

10. The computer-implemented method of claim 1 wherein the communications control messages are border gateway protocol (BGP) communications control messages, and wherein multiprotocol reachability network layer reachability information (MP_Reach_NLRI) included within a path attribute of each BGP communications control message is extended to include a nexthop, along with its associated prefix.

11. The computer-implemented method of claim 10 wherein the device is a BGP sender, wherein the receiver peer device is a BGP receiver, and wherein the BGP sender further confirms that the BGP receiver is capable of handling the extended MP_Reach_NLRI.

12. The computer-implemented method of claim 1 wherein the device is a route reflector.

13. A communications device for advertising multiple paths for a given prefix which provides at least a part of an address that defines a part of a communications network, the communications device comprising:
   a) at least one control processor configured to generate an ordered set of communications control messages, each of which communications control messages includes one or more paths, wherein each of the one or more paths included in each communications control message has the same set of attribute values, wherein the ordered set of communications control messages are generated and an order is determined using at least a prefix of the one or more paths included in each communications control message so that such communications control messages for a given prefix are sent more closely together than if the prefix were not considered; and
   b) a communications interface for sending, in the determined order, the ordered set of communications control messages to a receiver peer device.

14. The communications device of claim 13 wherein the communications control messages are border gateway protocol (BGP) communications control messages.

15. The communications device of claim 13 wherein the at least one control processor generates the ordered set of communications control messages such that paths with the same prefix, but a different set of attribute values, are sent to the receiver peer device in adjacent communications control messages.

16. The communications device of claim 13 wherein the at least one control processor generating the ordered set of communications control messages packs paths with the same prefix and the same set of attribute value(s) in a single communications control message.

17. The communications device of claim 13 wherein the communications control messages are border gateway protocol (BGP) communications control messages, and wherein network layer reachability information (NLRI) included within each BGP communications control message is extended to include a nexthop, along with its associated prefix.

18. The communications device of claim 13 wherein the communications control messages are border gateway protocol (BGP) communications control messages, and wherein multiprotocol reachability network layer reachability information (MP_Reach_NLRI) included within a path attribute of each BGP communications control message is extended to include a nexthop, along with its associated prefix.

19. The communications device of claim 13 wherein the communications device is one of (A) a router and (B) a route reflector.

20. A non-transitory storage medium storing processor executable instructions which, when executed by at least one control processor of a communications device, cause the communication device to perform a method for advertising multiple paths for a given prefix which provides at least a part of an address that defines a part of a communications network, the method comprising:
   a) generating, with the communications device, an ordered set of communications control messages, each of which communications control messages includes one or more paths, wherein each of the one or more paths included in each communications control message has the same set of attribute values, wherein the ordered set of communications control messages are generated and an order is determined using at least a prefix of the one or more paths included in each communications control message so that such communications control messages for a given prefix are sent more closely together than if the prefix were not considered; and
   b) sending, in the determined order, with the communications device, the ordered set of communications control messages to a receiver peer device.

* * * * *